June 5, 1956  S. E. W. OHLSSON  2,748,461
METHOD FOR ADJUSTING THE CLEARANCE IN BEARINGS
Filed May 8, 1953
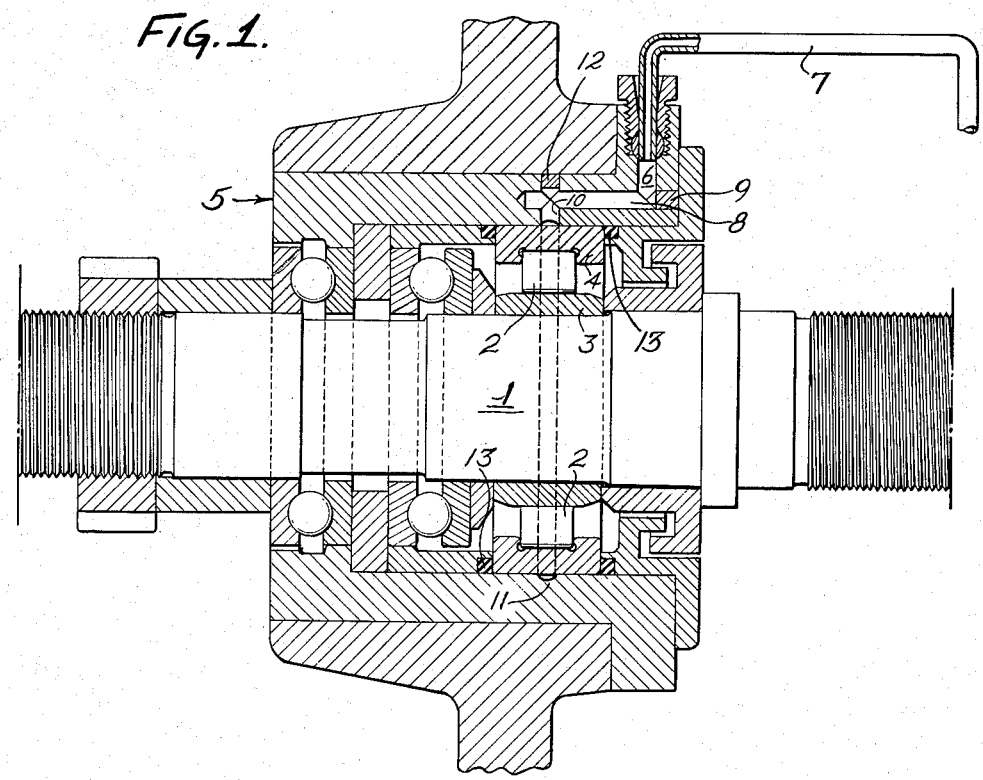
Inventor:
Sven Erik Willner Ohlsson
by his Attorneys
Howson & Howson United States Patent Office 2,748,461
Patented June 5, 1956

2,748,461
METHOD FOR ADJUSTING THE CLEARANCE IN BEARINGS

Sven Erik Willner Ohlsson, Goteborg, Sweden, assignor to Aktiebolaget Svenska Kullagerfabriken, Goteborg, Sweden, a corporation of Sweden Application May 8, 1953, Serial No. 353,764

Claims priority, application Sweden May 13, 1952

4 Claims. (Cl. 29—421)

In many cases it is required that machines run accurately and without vibration. In order to obtain this result, it is above all necessary that the rotating parts are, as far as possible, free from play. This is of special importance in the work spindles of machine tools and is an absolute requirement when the demands, as regards surface quality and accuracy, are high. Hitherto two main lines have been followed in attempting to obtain clearance-free bearings in machine tool spindles. According to one of the methods hitherto used, a pair of opposed bearings are adjusted relative each other to eliminate clearance. For this purpose it is necessary to use suitable bearings, i. e. deep groove bearings, angular contact bearings, spherical ball and roller bearings or taper roller bearings. According to the other method, the bearings used have tapered bores and are mounted on tapered seats on the work spindle. The bearing is pressed up onto the tapered seat to expand the inner bearing ring and thereby eliminates the clearance.

Both of these methods for eliminating the clearance have certain disadvantages. A pair of bearings creating opposed thrusts can be used only when the distance between the bearings is small and if the temperature-changes in the bearing within the intended speed limits are also small. It is, however, required of modern machine tools that they should be able to work at widely differing speeds while retaining accuracy and it is not possible to keep the temperature variations within narrow limits for greatly varying speeds. The other method is common in work spindles for machine tools, although the machining of the tapered seat causes difficulties because of the difficulty of sufficiently accurately checking the dimensions.

The method according to the invention described in the following avoids these difficulties and makes possible a substantial increase in running accuracy. The bearing clearance can be adjusted during running and be suited to all running conditions.

One form of the invention is shown in the accompanying drawing in which the single figure is an axial section through the main bearing of the work spindle.

The radial bearing 2 which carries the spindle 1 is provided with an inner race ring 3, having a cylindrical bore with a force fit relative to the spindle. The outer race ring 4 of the bearing 2 is fitted in the housing 5. The latter is provided with a radial channel 6, which is connected to a pipe 7, through which is admitted a suitable pressure medium, for example oil, in the manner described in the following. An axially extending channel 8 connects to the channel 6 and is closed outwardly by a plug 9, but opens inwardly to a radial channel 10. The last mentioned channel connects with an annular groove 11 at the bearing seat in the housing 5. The channel 10 is closed outwardly by a plug 12. The channel 10 and the groove 11 are for the sake of clarity, shown on an exaggerated scale. At each side of the outer bearing ring is provided a sealing ring 13 of rubber or of plastic.

The duct 7 is connected to any suitable means for generating the requiring fluid pressure, the fluid pressure medium being forced through the duct 7 and the channels 6, 8 and 10 to the annular groove 11, so that it exerts a pressure, not only on the housing 5, but also on the outer bearing ring 4. The fluid medium is prevented from leaking out by sealing rings 13. Since the bearing ring has a substantially weaker section than the housing 5, it becomes deformed to a greater extent by the pressure than the housing. The radial compression of the ring 4 results in a decrease in the clearance of the bearing 2. By suitably adjusting the fluid pressure it is possible to obtain the desired bearing clearance as required. It is thus possible to obtain a clearance-free bearing, not only under certain running conditions, but also as required for other running conditions.

The invention contemplates the use as the fluid pressure medium of fluid or plastic substances, such as plastics, which harden after pressing, so that pressure from the source need not be maintained continuously. The invention can be applied in the mounting of other bearing types, for example deep groove ball bearings and self-aligning ball and roller bearings. It has been described above as applied to a bearing in which it is desired to eliminate the clearance but it can naturally be used to obtain any desired clearance in the bearing. In certain cases it may be desired to use the device on the inner ring of the bearing. The invention can also be applied to ordinary sliding bearings in which one of the bearing pipes comprises an annular element.

I claim:

1. The method of adjusting the clearance in accurately running bearings for machine tools and the like in which one of the bearing elements comprises an annular member such as the race ring of a rolling bearing by altering the diameter of the ring by means of a fluid pressure medium forced between the ring and its seat under a pressure corresponding to the required change in diameter and subsequent solidification of said fluid medium.

2. The method according to claim 1 wherein the solidification of the fluid pressure medium is in response to said pressure.

3. The method according to claim 1 wherein the fluid pressure medium consists of a plastic material having the property of changing under pressure to solid state.

4. The method of adjusting the clearance in accurately running bearings for machine tools and the like in which one of the bearing elements comprises an annular member such as the race ring of a roller bearing by altering the diameter of the ring, said method comprising the steps of applying fluid pressure to the ring to alter the diameter, and solidifying the fluid pressure medium in situ while under said pressure to maintain the ring to the altered diameter.

References Cited in the file of this patent

UNITED STATES PATENTS

| 1,421,208 | Gauldie | June 27, 1922 |
| 1,425,979 | Kingsbury | Aug. 15, 1922 |
| 1,543,061 | Danielson | June 23, 1925 |
| 2,324,217 | Knauth | July 13, 1943 |

FOREIGN PATENTS

| 482,627 | Great Britain | Dec. 31, 1937 |